I. H. ATHEY.
TRACTION MECHANISM.
APPLICATION FILED MAR. 1, 1917.
1,435,788.
Patented Nov. 14, 1922.
6 SHEETS—SHEET 4.
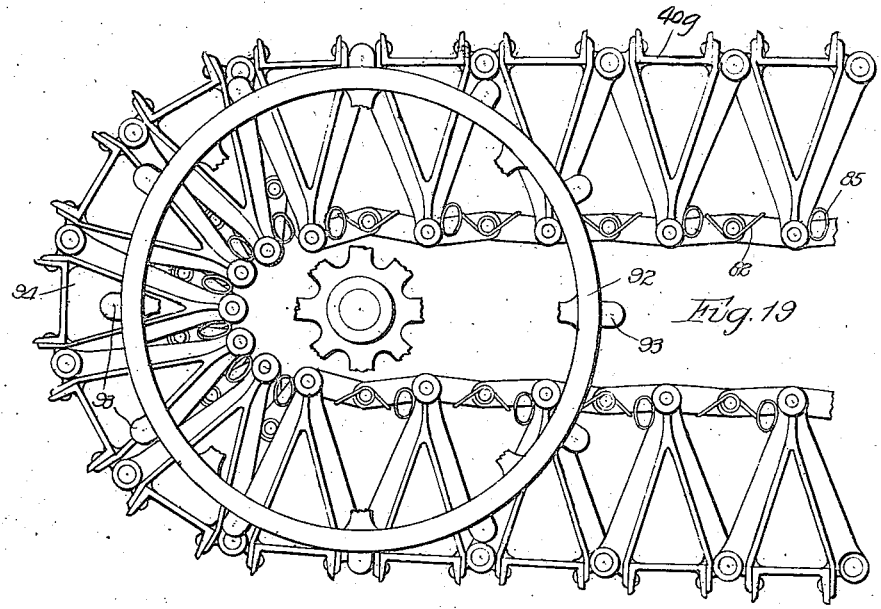
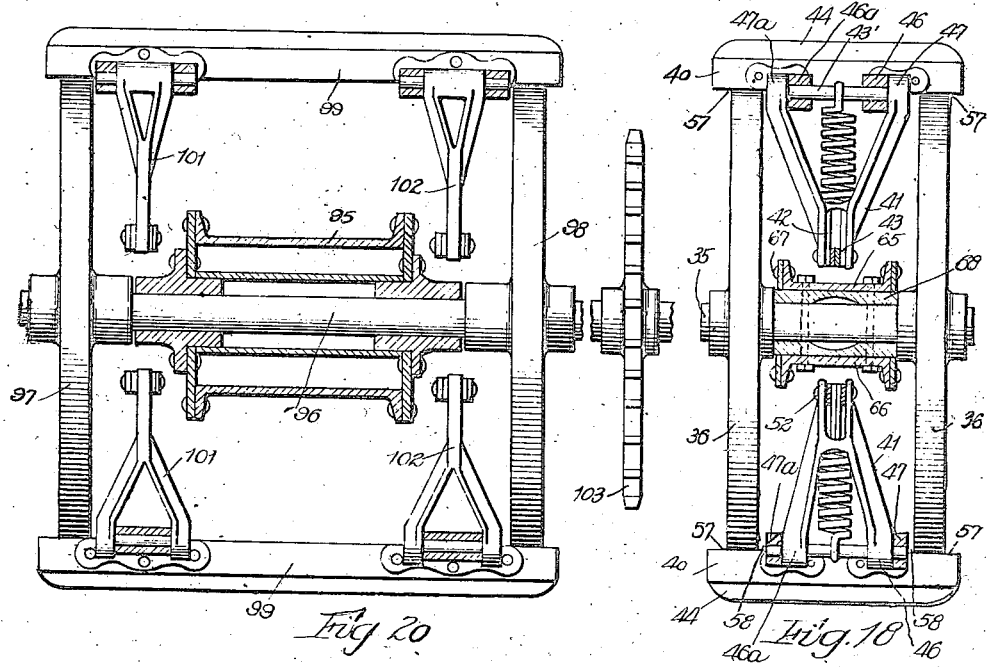
Witnesses:
Inventor
Isaac H. Athey
By Williams Bradbury &
Attorneys

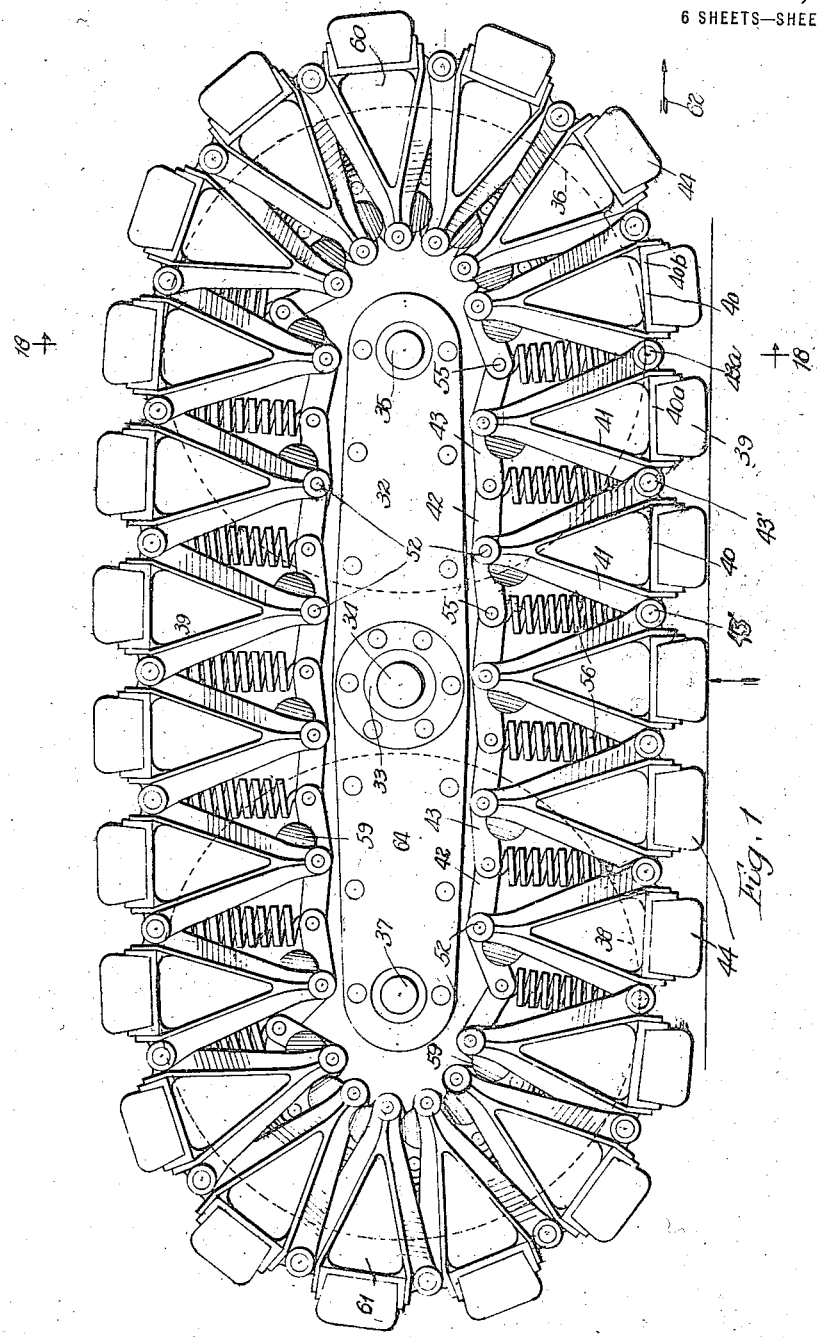

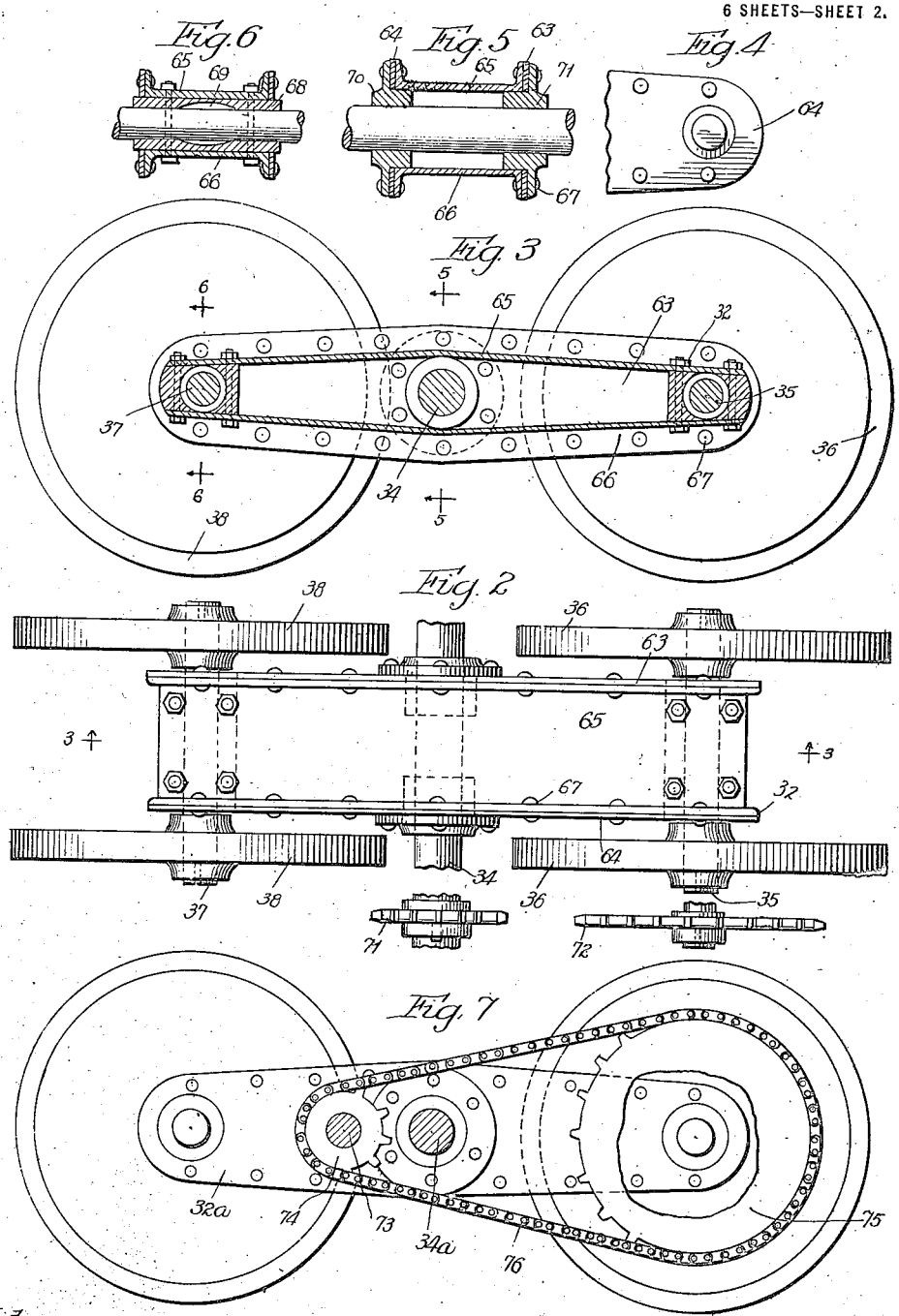

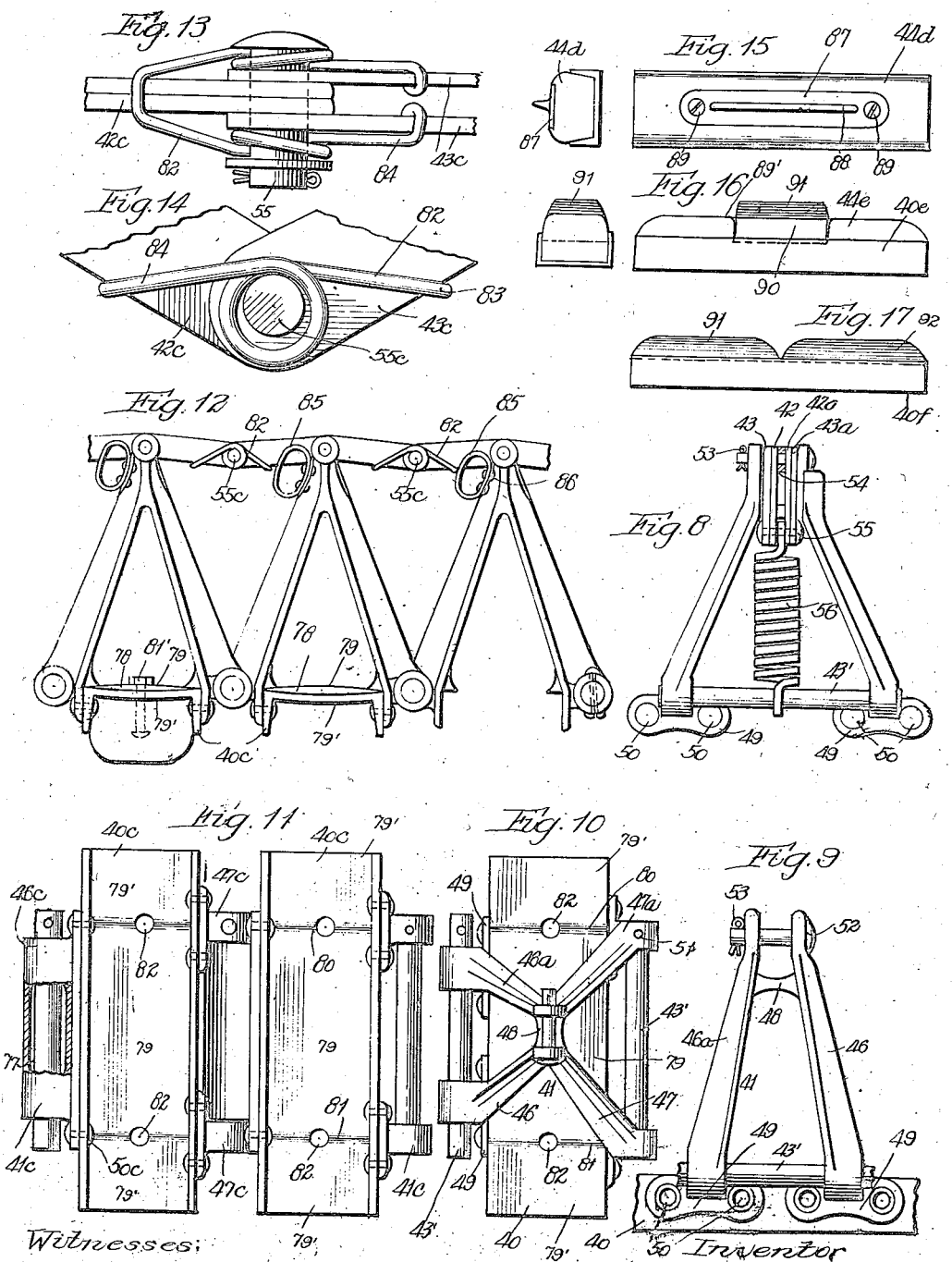

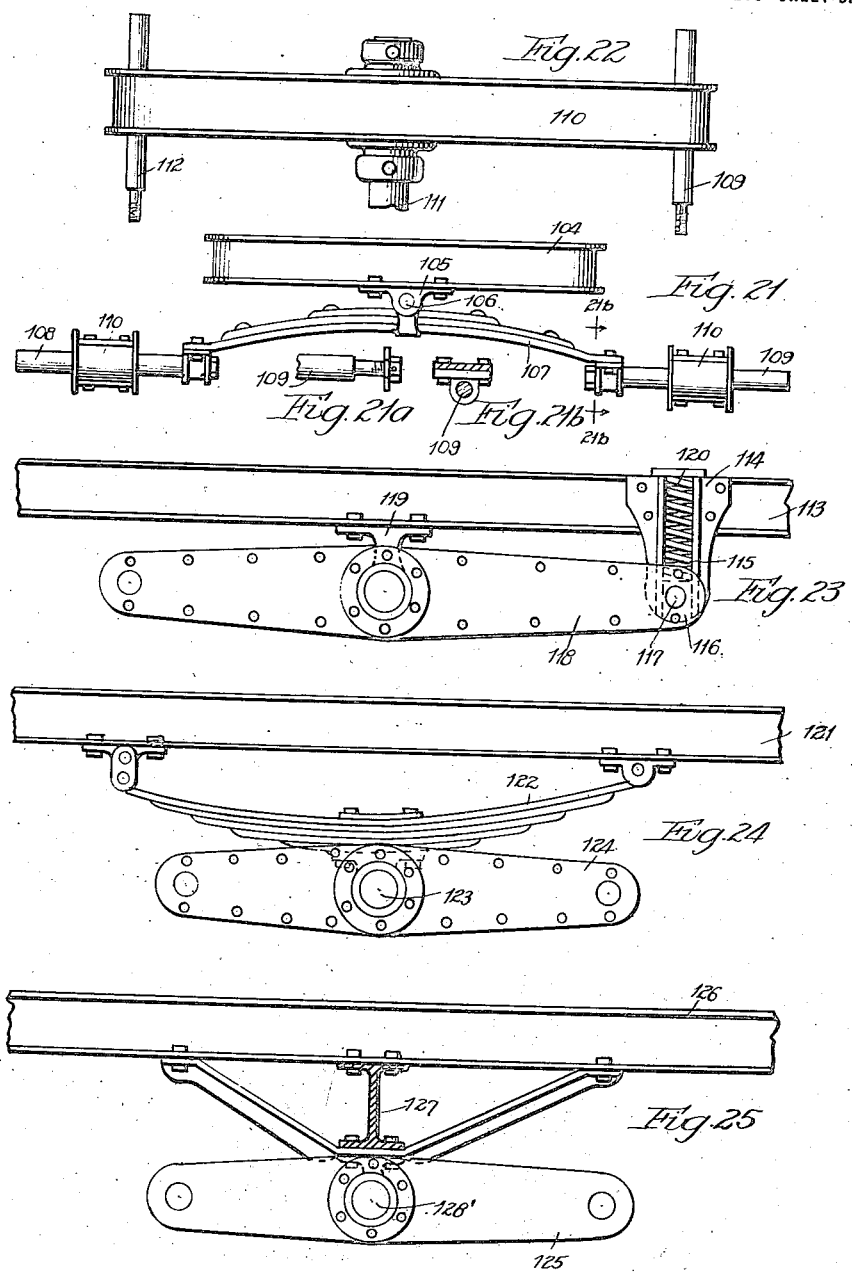

I. H. ATHEY.
TRACTION MECHANISM.
APPLICATION FILED MAR. 1, 1917.
1,435,788.
Patented Nov. 14, 1922.
6 SHEETS—SHEET 6.
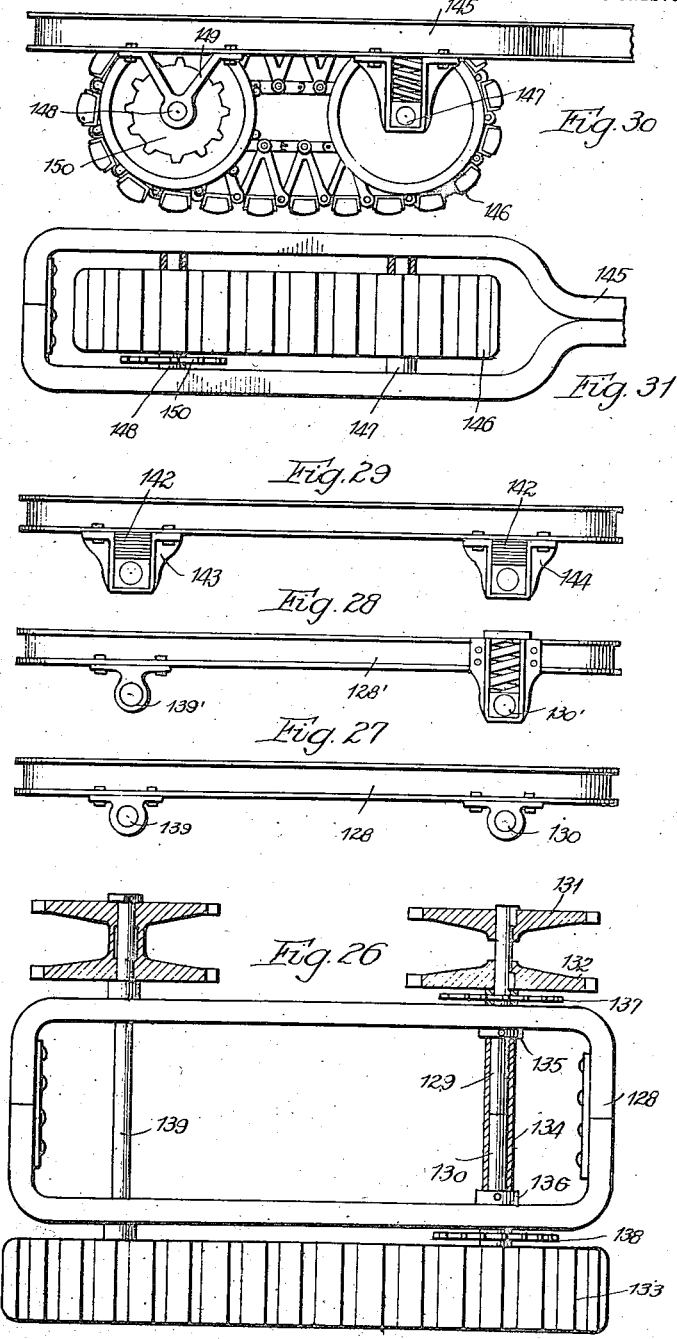

Patented Nov. 14, 1922.

1,435,788

UNITED STATES PATENT OFFICE.

ISAAC H. ATHEY, OF CHICAGO, ILLINOIS, ASSIGNOR TO ATHEY TRACTOR CO., OF CHICAGO, ILLINOIS.

TRACTION MECHANISM.

Application filed March 1, 1917. Serial No. 151,898.

*To all whom it may concern:*

Be it known that I, ISAAC H. ATHEY, a citizen of the United States, residing at Chicago, in the county of Cook and State of Illinois, have invented a certain new and useful Improvement in Traction Mechanism, of which the following is a full, clear, concise, and exact description, reference being had to the accompanying drawings, forming a part of this specification.

My invention relates to endless chain traction devices commonly employed on farm tractors and various forms of vehicle bodies which on account of their excessive weight and the rough or marshy condition of the ground over which they are required to travel necessitate the employment of relatively large area ground engaging traction surfaces. To provide such traction surfaces it has been the practice to mount upon the vehicle body an endless chain traction device commonly referred to as the caterpiller that includes a pair of bridge wheels over or around which the endless chain is arranged to pass. In order that the chain fulfill its function of distributing the weight of the vehicle body over the ground area equal to the ground engaging area of the chain, it is necessary that some means be employed to prevent upward sagging of that portion of the chain which extends between the aforesaid bridge wheels. To prevent such sagging and to hold the chain perfectly taut or rigid to enable the chain to fulfill its function numerous attempts have been made along the line of constructing a special chain composed of truss links which interlock or cooperate with one another when passing on the underside of and between the bridge wheels, whereby the links and thus the ground engaging portion of the chain become rigid, but which are arranged to fold when passing around the bridge wheels. These attempts have failed as evidenced by the fact that none of these devices are now employed to any extent.

The well known and universally used caterpillar tractor of today consists generally of a pair of bridge wheels, an endless traction chain passing around the wheels, and one wheel, or more often a plurality of wheels or rollers, mounted between the bridge wheels and arranged to engage the upper side of the ground engaging portion of the chain between the bridge wheels to prevent the sagging hereinbefore referred to. It is readily apparent that this construction is not theoretically the most efficient since it provides firstly a great amount of friction on the sag preventing rollers and secondly that the chain is not held rigidly but is permitted to conform to the shape of the rollers to some extent.

Theoretically the special link chain is the solution of the problem and it is the primary object of my invention to provide a traction element operating on the non-friction automatic truss chain principle which realizes its theoretical advantages in a commercial machine. The several novel arrangements, combinations, and structures of the parts going to make up a commercial machine having all of the advantages of the device only conceived in the abstract before the advent of my invention will be referred to in detail in connection with the accompanying drawings.

All of the above named features will be pointed out in connection with the accompanying drawings, wherein,

Figure 1 is a side elevational view of a traction element provided with the chain of my invention, the bridge wheels over which the chain is arranged to pass being illustrated in dotted lines;

Figure 2 is a plan view of the truss frame and the bridge wheels used in connection with the traction element shown in Figure 1;

Figure 3 is a cross sectional view taken along the line 3—3 of Figure 2, looking in the direction indicated by the arrows;

Figure 4 is a fragmentary detail view of one end of the truss frame;

Figure 5 is a vertical cross sectional view taken along the line 5—5 of Figure 3, looking in the direction indicated by the arrows;

Figure 6 is a vertical cross sectional view taken along the line 6—6 of Figure 3, looking in the direction indicated by the arrows;

Figure 7 is a view somewhat similar to

Figure 3, showing a modified arrangement for driving the traction chain from a source of power carried by the tractor;

Figure 8 is an end elevational view of one of the chain truss arms;

Figure 9 is a view similar to Figure 8 of the opposite side of the chain truss arm;

Figure 10 is a plan view of Figure 9;

Figure 11 is a bottom view of a modified chain, some of the parts being broken away to reveal more clearly the internal construction;

Figure 12 is a fragmentary enlarged detail view of the cooperating truss arms showing modified arrangements for tripping the auxiliary links and for cushioning the inner ends of the truss arms;

Figure 13 is a fragmentary bottom view of the auxiliary link shown in Figure 12;

Figure 14 is a side view of Figure 13;

Figure 15 is a detail view of one of the chain channel members provided with a special form of shoe;

Figures 16 and 17 are views showing the channel member provided with special resilient shoes;

Figure 18 is a vertical cross sectional view taken along the line 18—18 of Figure 1, looking in the direction indicated by the arrows;

Figure 19 is a fragmentary view showing a bridge wheel provided with driving teeth arranged to engage and drive the truss chain;

Figure 20 is a view similar to Figure 18, showing a modified form of chain;

Figure 21 is a front view of a tractor framework provided with resilient means for supporting the front ends of the chain truss frame;

Figure 21$^a$ is a detail view of the axle extending through the front end of the truss frame shown in Figure 21;

Figure 21$^b$ is a vertical cross sectional view taken along the line 21$^b$—21$^b$ of Figure 21, looking in the direction indicated by the arrows;

Figure 22 is a plan view of one of the truss frames shown in Figure 21;

Figure 23 is a fragmentary side elevational view of a tractor frame provided with a modified arrangement for resiliently connecting the front end of the truss frame with the tractor frame;

Figure 24 is an arrangement for resiliently supporting the truss frames when used on trucks, trailers, etc.;

Figure 25 is a view showing the truss frame rigidly connected with a truck or trailer framework;

Figure 26 is a plan view of a tractor in which the truss frames are not employed, some of the parts being shown in section to illustrate more clearly the internal construction;

Figure 27 is a side view of the tractor frame shown in Figure 26;

Figure 28 is a view similar to Figure 27, showing one shaft resiliently supported by the frame;

Figure 29 is a view similar to Figure 28 showing both the front and rear shafts resiliently mounted on the tractor frame;

Figure 30 is a side view of a single caterpillar drive, and

Figure 31 is a plan view of Figure 30.

Similar characters of reference refer to similar parts throughout the several views.

Referring first to Figure 1, 32 designates a truss frame provided with a journal box 33 arranged to receive an axle 34 carried by the tractor or vehicle body. The truss frame 32 is mounted on the axle 34 so as to oscillate relatively to the shaft to enable the track to adjust itself to uneven ground. The front end of the truss frame 32 carries a shaft 35 upon which are keyed a pair of bridge wheels 36—36, (Figure 18). The bridge wheels are shown in dotted lines in Figure 1. The rear end of the truss frame 32 is provided with the shaft 37 upon which are mounted a similar pair of truss wheels 38. Attention is directed to the fact that the distance between the shaft 35 and the axle 34 is greater than the distance between the axle 34 and the shaft 37, or in other words that the axle 34 is mounted in the truss frame slightly behind the longitudinal center of the frame. This arrangement enables the front of the traction element to mount obstructions more easily when traveling over rough or hilly ground.

Extending around the four bridge wheels mounted on the truss frame 32 is a truss chain 39 consisting of a plurality of channel irons 40, a plurality of truss arms 41, each riveted or otherwise secured to one of the channel irons 40, and auxiliary links 42 and 43 between each pair of truss arms. The several truss arms 41 are pivotally connected together by means of the several pins shown at 43$^1$—43$^1$. Each one of the channel irons 40 is arranged to receive a block or shoe 44 made of wood, rubber, or some suitable composition, which when used form the ground engaging traction shoes of the caterpillar.

In Figures 8, 9, and 10 I have shown detail views of one of the truss arms 41 forming part of the chain 39. Each truss arm 41 is constructed as shown in these figures with four inwardly extending arms 46, 46$^a$, 47 and 47$^a$, the arms being connected at their upper ends by the web 48. The arms 47 and 47$^a$ are spaced a greater distance apart at their lower ends than are the arms 46 and 46$^a$, so that the arms 46 and 46$^a$ of an adjacent truss arm may be inserted between the arms 47 and 47$^a$. Each one of the truss arms 41 carries a plurality of apertured flanges 49—49 arranged to be attached to its channel iron 40 by means of the several rivets shown at 50—50. The several pivot pins $43^1$ extend through registering apertures in the arms 46, $46^a$, 47 and $47^a$, and are rigidly attached to one of the arms 47 and $47^a$ by means of a pin shown at 51. Since each one of the pivot pins 43 is thus fixed to the arms 47 and $47^a$ and movable with respect to the arms 46 and $46^a$ of the adjacent truss member I construct the arms 46 and $46^a$ as shown in Figure 10, so that they have a relatively wide pivot pin bearing surface.

The upper end of each one of the truss members 41 carries a pin 52 retained in place by means of the cotter pin 53. Mounted on each one of the pins 52 are four link members 42, $42^a$, 43 and $43^a$, the links 42 and $42^a$ being mounted inside of the links 43 and $43^a$. A washer 54 may be employed to space the links 42 and $42^a$ from each other. The auxiliary link members 42 and 43 extend laterally and are connected together by means of the several pivot pins shown at 55—55. Connected with each one of the pivot pins 55 is a strong stiff coil spring 56 attached at its other end to the truss arm pivot pin $43^1$, lying directly opposite the pivot pin 55, the tendency of the springs 56 being to move the pivot pins 55 toward the pins $43^1$.

Referring now to Figure 18 which is a cross sectional view taken along the line 18—18 of Figure 1, it will be observed that the several channel irons 40 extend laterally to provide the bridge wheel engaging surfaces 57—57, the several truss arms 41 being mounted so that they travel between the bridge wheels and thus form guides whereby the traction element is held in place. To permit the tractor upon which the track is mounted to tip in traveling over rough ground an idler space 58 is provided between the bridge wheels and the truss arms, so that the wheels may shift relatively to the truss chain.

From the description thus far given it will be observed that when the tractor is in operation the chain 39 will travel around the bridge wheels, folding as shown in Figure 1 when passing around the wheels and remaining perfectly rigid between the front and rear bridge wheels, so that the weight of the tractor is supported by the central portion of the chain. I prefer to make the auxiliary links 42 and 43 somewhat shorter than the distance between two adjacent pivot pins $43^1$—$43^1$, so that the chain is given the convex conformation shown in the drawings. This convex conformation produces a rocker effect which adds materially to facilitate turning of the tractor, trailer, or truck, and also enables the tractor to mount obstructions more easily than if no such conformation of the chain is provided. Any tendency to force the central lower truss arm member upwardly in the direction indicated by the arrow will result in a compression stress on the outer ends of the main links and a tensile stress placed upon the several auxiliary links 42 and 43, which may be lightly constructed to support a great load. As the chain travels around the bridge wheels the inner ends of the several truss arms 41 are moved toward one another and, since the springs 56—56 are constantly tending to move the several pivot pins 55 toward the pivot pins $43^1$ or, in other words, to collapse the several auxiliary links 42 and 43, the auxiliary links will be moved to the positions shown when the several truss arms are traveling around the bridge wheels. When the traction device is traveling at a relatively high rate of speed, it is necessary to provide some shock absorbing means to cushion the return of the auxiliary links from their folded or collapsed position to their operating position and to accomplish this object the several springs 56 are made relatively large and strong, so that they serve to act as a combination trip and shock absorber. When the several truss arms 41 are passing around the bridge wheels the inner ends of the arms swing against one another and it is desirable that some means be provided to prevent the arms from hitting each other. In Figure 1 I have shown at 59 one form of device which may be used to accomplish this purpose. 59 illustrates a rubber block held in place on the inner end of each of the truss arms 41 by rivets or any other suitable securing means. When the several truss arms 41 are folded or collapsed as in traveling around the bridge wheels the rubber buffers 59—59 will extend between the inner ends of the truss arms so as to prevent sharp metallic striking of the chain elements when the tractor is in operation.

Attention is directed to the fact that the chain 39 is made somewhat greater in length than is necessary for it to pass around the bridge wheels. This construction provides a space 60 at the front end of the tractor and a space 61 at the rear end thereof. The advantages of this arrangement will be brought out more clearly by assuming that the traction element is traveling in the direction indicated by the arrow 62. As the front bridge wheels 36—36 travel from the channel iron $40^a$ to the channel $40^b$, the axis of these bridge wheels is maintained in a single horizontal plane, in other words, the bridge wheels do not drop in traveling from one of the channel irons to the next, nor are they raised as would be the case if the chain were tightly fitting around the bridge wheels. Another important advantage of this construction is the fact that when the weight of the tractor is removed from the channel iron $40^a$ and placed upon the channel iron $40^b$ the truss arm 41 associated with the channel 40$^b$ will have rotated about its pivot pin 43$^a$ a considerable extent, so that after the channel 40$^b$ receives the load a very small amount of rotation of its associated truss arm is needed to bring the arm to the position which it assumes in passing between the bridge wheels. This arrangement reduces the wear between the pivot pins and truss arms to a minimum.

The space 61 provided between the chain and the rear bridge wheels serves the same purpose in that the rear bridge wheels are neither dropped nor raised in traveling from one channel iron to the next.

Figures 2 to 6 inclusive are detail views of the truss arm and bridge wheels employed in connection with the device shown in Figure 1. The truss frame 32 comprises a pair of side plates 63, 64, an upper channel member 65, and a lower channel member 66, the plates and channel members being connected together by means of the several rivets shown at 67. Each end of the truss frame 32 is provided with a journal member 68 provided with an annular groove 69 arranged to receive a lubricant. The journal for the tractor axle is provided by the tow journal members 70 and 71 (Figure 5) which are attached to the outer plates 64 and 65. The construction of the truss frame though light in weight is particularly strong and is well adapted for the chain shown in Figure 1, for the reason that the truss arms 41 of the chain may be made comparatively long.

The device shown in Figure 1 is intended primarily to be used as a trailer, that is, without any source of power connected directly to the truss chain. If it is desired to apply power to the truss chain the arrangement shown in Figure 2 may be employed. In this Figure, 71 illustrates a sprocket gear mounted on the axle 34, and 72 illustrates a second sprocket gear mounted on the front shaft 35. The two sprocket wheels 71 and 72 are connected by means of a suitable chain so that power may be transmitted from the sprocket 71 to the bridge wheels 36. The sprocket 71 may be loosely mounted on the axle 34 and if so mounted the axle 34 is fixed and suitable gearing provided between the source of power and the sprocket 71. If the axle 34 is a live axle the sprocket 71 is keyed thereto, as shown in the drawings.

In Figure 7 I have shown a slightly modified arrangement for transmitting power to the truss chain. In this Figure, 73 illustrates an auxiliary shaft carried by the tractor frame upon which is mounted a sprocket wheel 74. The front bridge wheels are connected to the sprocket gear 75, which in turn is connected with the sprocket 74, by means of the chain 76. The chain 76 extends around the axle 34$^a$ in a manner such that the truss frame 32$^a$ may rock or oscillate about the axle 34$^a$ without in any way interfering with the mechanical connection between the shaft 73 and the front bridge wheels. The shaft 73 is located in proximity to the axle 34$^a$ so that upon oscillation of the truss frame the chain 76 does not slacken to any appreciable extent.

In Figure 11 I have shown a bottom view of a modified form of truss arms. In this Figure, 40$^c$—40$^c$ designate the channel members, 41$^c$—41$^c$ the truss arms, and 50$^c$ the rivets for connecting the channel members to the truss arms. Each truss arm carries the two arms 47$^c$—47$^c$ corresponding to the arms 47 and 47$^a$ of Figure 10, and a sleeve 46$^c$ corresponding to the lower ends of the arms 46 and 46$^a$ of Figure 10. The sleeve 46$^c$ is provided at its central portion with an annular groove 77 for the reception of lubricating oil.

In Figure 12 I have shown an enlarged detail view of the truss arms and the channels attached thereto. The several channel members are corrugated or ribbed as shown at 78. These ribs are not shown in Figure 1, but are clearly illustrated in the enlarged views shown in Figures 10, 11 and 12. The central portion of each one of the channels is upwardly dished at 79, while the outer ends of the channels are downwardly dished at 79$^1$, with a result that two lateral ribs are provided at 80 and 81 which serve to reinforce the channel members and to give them the additional necessary strength to prevent buckling under heavy compression. The radius of the curvature 79$^1$ will depend upon firstly the diameter of the bridge wheels and secondly the degree of idling space employed between the chain and the bridge wheels. The curvature 79$^1$ together with the idling space cooperate to produce the smooth travel of the bridge wheels over the inside of the chain. When the tractor is to travel over snow or extremely soft, sandy, or ashy ground, which requires the use of gripping cups, the several shoes 44 may be removed, each shoe being removably held in one of the channels by the pair of bolts shown at 81$^1$ which extend through the apertures 82—82 provided in each of the channels.

In Figure 12 I have shown a modified trip and shock absorber for the auxiliary links, and in Figures 13 and 14 detail views thereof. The pivot pin 55$^c$ pivotally connects the auxiliary links 42$^c$ and 43$^c$ as in Figure 1. Mounted around the pivot pin 55$^c$ as shown in Figures 13 and 14 is a spring 82 having its end 83 extending under the links 43$^c$ and its end 84 extending under the links 42$^c$, the tendency of the spring being to move the outer ends of the springs 84 and 83 upwardly and thus the pivot pin 55° downwardly. This arrangement together with the buffers is particularly desirable when the traction element is used for high speed. Instead of the rubber buffers 59 shown in Figure 1, the spring members 85 (Figure 12) may be employed. These spring members consist of a metallic strap bent to form a loop and attached to one of the truss arms by means of the rivets shown at 86.

In Figure 15 which shows a plan view and an end elevational view of a modified form of tractor shoe I have shown a wooden shoe 44$^d$ provided with a plate 87 carrying a longitudinal ridge 88. The plate 87 is attached to the shoe at 89—89 in any suitable manner.

In Figure 16 I have shown a side elevational view and an end elevational view of another modified form of shoe arrangement. In this figure the channel member is shown at 40$^e$, and the wooden block at 44$^e$. The central portion of the block 44$^e$ is recessed at 89$^1$ and provided with a metallic retainer 90, serving to hold in place a rubber block 91.

In Figure 17 the channel 40$^f$ is arranged to carry the two rubber blocks shown at 91 and 92.

In Figure 19 I have shown a fragmentary view of a traction element employing the spring trip and spring buffer shown in Figures 12, 13 and 14. In this figure the front bridge wheels 92 are provided with teeth or lugs 93 arranged to extend between adjacent channel members 40$^g$. The idler space 94 provided between the chain and the bridge wheels is such that the loop of the chain extending around the bridge wheels contains one more space to accommodate a tooth or lug 93 than there are lugs on each of the bridge wheels provided on the front half of the wheels. In the operation of the device shown in this figure the bridge wheels are driven by a suitable source of power to drive the chain around the bridge wheels. The central portion of the bridge wheel 92 shown in this figure has been broken away to illustrate more clearly the construction and operation of the truss arms and their auxiliary connecting links.

In Figure 20 I have shown a traction element which contains two chains of truss arms. In this figure 95 illustrates a truss frame supporting a shaft 96 upon which are mounted the bridge wheels 97 and 98. Arranged to rest on the peripheries of the bridge wheels are the channel members 99. One side of the channel members is connected to the truss chain 101 and the other side to the truss chain 102, the individual truss arms of these truss chains being somewhat similar to the truss arms shown in Figures 8 and 9. If power is to be applied to the truss chain the sprocket wheel 103 is mounted on the shaft 96 and the bridge wheels 97 and 98 rigidly attached to the shaft. The construction shown in this figure makes it possible to provide a relatively wide traction element and one which is particularly strong and sturdy in construction.

In Figure 21 I have shown a front view of a tractor frame at 104. Attached to the underside of this frame is a block 105 carrying a pivot pin 106 arranged to pivotally attach the leaf springs 107 to the framework 104. The outer end of the leaf springs 107 are attached to the shafts 108 and 109 each extending through the front end of a truss frame 110. The central portion of the truss frame is mounted on the axle 111 (Figure 22) in turn carried by the tractor frame 104. The rear end of the truss frame 110 is provided with a shaft 112 which is arranged to receive the rear bridge wheels, whereas the shaft 108 receives the front bridge wheels. By means of the pivot and spring arrangement 106 and 107 the front ends of the traction elements are resiliently and pivotally connected to the tractor frame so that the traction elements may rock relatively to the frame and are normally maintained in proper position for operation. If desired the shafts 112 mounted at the rear ends of the truss frames may be resiliently connected to the frame 104 by the same mechanism shown at 105, 106 and 107.

In Figure 23 I have shown a modified arrangement for resiliently connecting the front end of a truss frame to the tractor frame. In this figure, 113 designates the tractor framework which is provided with a plate 114 containing a vertical slot or guide 115 receiving a journal box 116 bearing the shaft 117 carried at the front end of the truss frame 118. The truss frame 118 is mounted on a stud 119 carried by the frame 113 so that the truss frame may oscillate relatively to the stud. To hold the front end of the truss frame 118 normally in its lowermost position as shown in the drawings a helical compression spring 120 is employed, whereupon upward movement of the front end of the truss frame is accomplished against the tension of the spring. The means disclosed in Figures 21 and 23 inclusive for holding one or both ends of the truss frame maintains the truss frame in a plane normal to the axis of its supporting axle.

In Figure 24 I have shown a truck or trailer framework at 121 which carries the leaf spring arrangement shown at 122. This spring arrangement carries the axle 123 which serves to support the truss frame 124. In Figure 25 the truss frame 125 is non-resiliently connected with the truck or trailer frame 126 by means of the rigid supporting members 127 and the axle 128$^1$ attached thereto.

In Figure 26 I have shown a tractor employing the traction chain of my invention without the truss frame. In this Figure, 128 designates the tractor frame, the forward end of which is provided with two live axles 129 and 130. The axle 129 carries the two bridge wheels 131 and 132 and the axle 130 carries two similar bridge wheels over which the chain 133 is arranged to pass. A sleeve 134 is provided around the inner ends of the axles 129 and 130 and the axles held in place by means of the collars shown at 135 and 136. The axle 129 has keyed thereto the sprocket wheel 137 and the axle 130 the sprocket 138, the function of the sprocket wheels being to serve as instrumentalities for applying power to the two live axle sections. At the rear of the frame 128 is provided the fixed axle 139 carrying four bridge wheels, two on each side of the framework, each pair of bridge wheels arranged to cooperate with the truss chain as hereinbefore pointed out.

Figure 27 is a side elevational view of the frame 128 shown in Figure 26.

In Figure 28 I have shown means for resiliently supporting the live axle sections 129 and 130. I wish it to be understood that the resilient supporting means may be applied either at the front or the rear of the traction element or on the live or the other axle.

In Figure 29 I have shown means for resiliently supporting both the live axle sections and the axle 139. In this figure, 142 and 142 designate blocks of rubber mounted in the guide pieces 143 and 144 carried respectively at the rear and front ends of the tractor frame.

In Figures 30 and 31 I have shown a single drive traction element which comprises a frame 145 extending around the chain 146. The front shaft 147 is resiliently connected with the frame 145 as shown in Figure 30, while the rear shaft 148 is mounted on the frame 145 by the brace arms 149. A sprocket is shown at 150 for applying power to the truss chain.

Having thus described my invention, what I claim as new and desire to secure by Letters Patent of the United States, is:

1. A truss link for tractor chains comprising an external member of substantially the width of the tread and of general rectangular shape in a horizontal plane, four truss arms extending from points near the corners of said rectangular external member to an apex at or near which they are integrally joined, the space between the side arms providing discharge passages for material forced into the pyramid formed by said arms through the openings between the end arms during the use of the device.

2. A tractor chain link comprising a base member, a pair of pivot carriers on opposite ends of said base member, four arms extending upwardly from spaced positions on said base member and integrally united at a common apex, and a pivot carrier in the apex formed by said arms.

3. In a traction device the combination of an endless chain made up of truss members each consisting of four inwardly tapering arms integrally connected near their inner ends, and a laterally extending outwardly facing channel member fixed to each of the truss members and disposed between the outer ends of the arms of each truss member.

4. Traction mechanism comprising a pair of wheels, and an endless chain passing around said wheels, said chain consisting of truss arms connected at their inner ends and pivoted together at their outer ends, and outwardly facing channel members fixed to the outer ends of said truss arms, each of said channel members being corrugated to form on the base thereof a laterally extending reinforcing rib to prevent crumpling under compression.

5. A tractor chain link comprising a tread carrying base member, four arms extending from spaced positions thereon to an apex above the base member, and reinforcing ribs extending across the base member between each of the forward and rear arms to prevent crumpling under compression.

6. A tractor chain link comprising a base, four pivot supports for each base, all substantially in the horizontal plane of said base, a fifth pivot support offset from the plane of said base, and four arms each extending in a straight line from a pivotal support in the base to the fifth pivotal support.

7. A tractor comprising a chain, the links of which are arranged side by side and in spaced relation to each other, means for pivotally connecting each link with the adjacent links, and a load carrying drive wheel having sprocket teeth adapted to project between adjacent links in substantial alinement with said pivot means.

8. A vehicle comprising an axle, a beam rotatably mounted on each end of said axle, the said beams being free to rotate on said axle independently of each other, a pair of load supporting wheels rotatably mounted on each end of said beams, the respective wheels of each pair lying on opposite sides of said beams, a track chain trained around the wheels of each beam, the said chains each comprising pivotally mounted links having inwardly extending truss arms, a truss chain connecting the inner ends of said truss arms, the pitch of said truss chain being less than the pitch of said track chain, whereby an outwardly convex arcuate track section is provided for supporting said wheels, the length of each track chain being greater than required to pass around the wheels of each beam, thereby permitting sufficient slack to develop to allow the leading link of said track section to occupy a position as a continuation of said arc prior to assumption of load.

9. A vehicle comprising an axle, a beam rotatably mounted on each end of said axle, the said beams being free to rotate on said axle independently of each other, load supporting wheels rotatably mounted on each end of said beams, a track chain trained around the wheels of each beam, the said chains each comprising pivotally mounted links having inwardly extending truss arms, a truss chain connecting the inner ends of said truss arms, the pitch of said truss chain being less than the pitch of said track chain, whereby an outwardly convex arcuate track section is provided for supporting said wheels, the length of each track chain being greater than required to pass around the wheels of each beam, thereby permitting sufficient slack to develop to allow the leading link of said track section to occupy a position as a constinuation of said arc prior to assumption of load.

10. A vehicle comprising an axle, a beam rotatably mounted on each end of said axle, the said beams being free to rotate on said axle independently of each other, load supporting wheels rotatably mounted on each end of said beams, a track chain trained around the wheels of each beam, the said chains each comprising pivotally mounted links having inwardly extending truss arms, a truss chain connecting the inner ends of said truss arms, the pitch of said truss chain being less than the pitch of said track chain, whereby an outwardly convex arcuate track section is provided for supporting said wheels, the length of each track chain being greater than required to pass around the wheels of each beam, thereby permitting sufficient slack to develop to allow the leading link of said track section to occupy a position as a continuation of said arc prior to assumption of load.

11. A vehicle comprising an axle, a beam rotatably mounted on each end of said axle, the said beams being free to rotate on said axle independently of each other, load supporting wheels rotatably mounted on each end of said beams, a track chain loosely trained around the wheels of each beam, the said track chain being trussed to provide an externally convex arcuate wheel-supporting track section between said wheels, said trussing preventing flattening or collapsing of the track arc by upward pressure, the chain having excess length permitting development of sufficient slack at the forward end thereof to allow the leading link of the track section to occupy a position as a continuation of the said arc prior to assumption of load.

12. A vehicle comprising an axle, a beam rotatably mounted on each end of said axle, the said beams being free to rotate on said axle independently of each other, load supporting wheels rotatably mounted on each end of said beams, a track chain trained around the wheels of each beam, the said track chains being trussed to provide convex arcuate wheel-supporting track sections and of such length as to permit the leading links thereof to assume positions as a continuation of said arcs before assumption of load.

13. A vehicle comprising an axle, a beam rotatably mounted on each end of said axle, said beams being free to rotate on said axle independently of each other, a pair of load supporting wheels rotatably mounted on each end of said beams, the respective wheels of each pair lying on opposite sides of said beams, and a track chain loosely trained around the wheels of each beam, the said track chain being of such length as to permit the links thereof to assume their load supporting position before assumption of load.

14. The combination with a track chain comprising a plurality of links each having tread portions provided with extensions pivotally secured together and holding said tread portions in spaced relation, and a pair of wheels rolling on the ends of said tread portions and provided with sprocket teeth meshing with the spaces between said tread portions and engaging said tread portions at points radially beyond the pivot points of said links.

15. The combination with a track chain comprising a plurality of links each having tread portions provided with extensions pivotally secured together and holding said tread portions in spaced relation and a wheel rolling on said tread portions and provided with sprocket teeth meshing with the spaces between the tread portions all adjacent links and engaging with said tread portions at points radially beyond pivot points of said links.

16. The combination with a chain comprising a plurality of links each having tread portions provided with extensions pivotally secured together and holding said tread portions in spaced relation, and a pair of wheels rolling on said tread portions and provided with sprocket teeth meshing with the spaces between said tread portions and engaging said tread portions at points on each side of said extensions.

17. The combination with a chain comprising a plurality of links each having tread portions provided with extensions pivotally secured together and holding said tread portions in spaced relation, of a wheel rolling on said tread portions and provided with sprocket teeth meshing with the spaces between said tread portions and engaging said tread portions at one side of said extensions.

18. The combination with a chain comprising a plurality of links each having tread portions provided with extensions pivotally secured together and holding said tread portions in spaced relation, of a pair of wheels rolling on the ends of said tread portions at one side of said extensions.

19. The combination with a track chain comprising a plurality of links having tread portions provided with lateral extensions, of pivots connecting said extensions together, whereby said tread portion are spaced from each other, a load supporting wheel rolling on said tread portions and provided with sprocket teeth meshing with the spaces between said tread portions in axial alignment with said pivots.

20. The combination with a track chain comprising a plurality of links having tread portions provided with lateral extensions, of pivots connecting said extensions together, whereby said tread portions are spaced from each other, a load supporting wheel rolling on said tread portions and provided with sprocket teeth which when in engagement with said track are in axial alignment with said pivots.

21. A vehicle comprising a load-supporting frame, a member pivotally mounted intermediate its ends upon said frame, a pair of wheels rotatably mounted upon said member on each side of its pivot point, and a track chain loosely trained around said pairs of wheels, the said track chain being of such length as to permit the links thereof to assume their load supporting position before assumption of load.

22. A vehicle comprising a load-supporting frame, a member pivotally mounted intermediate its ends upon said frame, a pair of wheels rotatably mounted upon said member on each side of its pivot point, and a track chain loosely trained around said pairs of wheels, the said track chain being trussed to provide a convex arcuate wheel supporting section, and of such length as to permit the leading link thereof to assume a position as a continuation of said arc before assumption of load.

23. A vehicle having a load-supporting element comprising a pair of wheels supported in alinement, and a track chain trained about said wheels and of such length as to permit the leading link of the track section to assume its load-supporting position before assumption of load, the said wheels being in continuous rolling engagement with the interior of said track chain, 24. A vehicle comprising a beam, a pair of load suporting wheels rotatably mounted on each end of said beam, the respective wheels of each pair lying on opposite sides of said beam, and a trussed track chain trained around the wheel of said beam, the length of the track portion of said chain between the tops and bottoms of one pair of wheels being greater than the corresponding tread portions of said wheels for imposing the weight of the portion of the chain between the top and bottom of said last-named pairs of wheels upon each succeeding link to push it downwardly to its trussed position before said last-named pair of wheels rolls upon it.

In witness whereof, I hereunto subscribe my name this 26th day of February, A. D. 1917.

ISAAC H. ATHEY.

Witnesses:
ROBERT F. BRACKE,
ALBIN C. AHLBERG.